United States Patent
Yamamoto

(10) Patent No.: US 9,269,933 B2
(45) Date of Patent: Feb. 23, 2016

(54) GASKET

(75) Inventor: Hiroki Yamamoto, Fujisawa (JP)

(73) Assignee: NOK Corporation (JP)

( * ) Notice: Subject to any disclaimer, the term of this patent is extended or adjusted under 35 U.S.C. 154(b) by 113 days.

(21) Appl. No.: 13/990,640

(22) PCT Filed: Nov. 22, 2011

(86) PCT No.: PCT/JP2011/076843
§ 371 (c)(1),
(2), (4) Date: May 30, 2013

(87) PCT Pub. No.: WO2012/077491
PCT Pub. Date: Jun. 14, 2012

(65) Prior Publication Data
US 2013/0249173 A1    Sep. 26, 2013

(30) Foreign Application Priority Data

Dec. 8, 2010 (JP) .................. 2010-273134

(51) Int. Cl.
| | |
|---|---|
| *H01M 2/08* | (2006.01) |
| *F16J 15/02* | (2006.01) |
| *F16J 15/06* | (2006.01) |
| *F16J 15/12* | (2006.01) |

(52) U.S. Cl.
CPC ............... *H01M 2/08* (2013.01); *F16J 15/024* (2013.01); *F16J 15/025* (2013.01); *F16J 15/061* (2013.01); *F16J 15/127* (2013.01)

(58) Field of Classification Search
CPC ....... F16J 15/104; F16J 15/061; F16J 15/062; F16J 15/127

USPC .......... 277/639, 937, 928, 640, 641
See application file for complete search history.

(56) References Cited

U.S. PATENT DOCUMENTS

| | | | | |
|---|---|---|---|---|
| 2,815,549 | A | * | 12/1957 | Olson .............................. 164/37 |
| 3,490,776 | A | * | 1/1970 | Avery ........................... 277/649 |
| 3,930,656 | A | * | 1/1976 | Jelinek ........................... 277/611 |
| 4,158,757 | A | * | 6/1979 | Reichert et al. ............. 200/302.1 |
| 4,535,996 | A | * | 8/1985 | Cardis et al. ................... 277/313 |
| 5,492,343 | A | * | 2/1996 | Smith et al. .................... 277/638 |
| 5,735,529 | A | | 4/1998 | Lawrence |
| 6,609,717 | B2 | * | 8/2003 | Hinson .......................... 277/598 |
| 2006/0290075 | A1 | * | 12/2006 | Tani .............................. 277/628 |

FOREIGN PATENT DOCUMENTS

| | | |
|---|---|---|
| JP | 59-118895 U | 8/1984 |
| JP | 10-501873 A | 2/1998 |

(Continued)

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

In a gasket sealing a gap between two opposed surfaces, the gasket is constructed by a tabular main body portion, two lip-like projections which are provided in one surface of the main body portion, and extend in parallel to each other along the main body portion, two small projections which are provided in the other surface of the main body portion and extend in parallel to each other along the main body portion, through holes which are provided at a plurality of positions of the main body portion, and an annular seal portion which is provided in such a manner as to surround the through holes. Accordingly, it is possible to have a good installation property of the gasket and a good stability (seating property) after the installation, and the gasket can be compressed highly by a low reaction force, and has a high reliability.

7 Claims, 5 Drawing Sheets

(56) References Cited

FOREIGN PATENT DOCUMENTS

| | | |
|---|---|---|
| JP | 11-089066 A | 3/1999 |
| JP | 2000-291510 A | 10/2000 |
| JP | 2002-174329 A | 6/2002 |
| JP | 2003-201929- | 7/2003 |
| JP | 2005-016621 A | 1/2005 |
| JP | 2009-156445 A | 7/2009 |

\* cited by examiner

GASKET

CROSS-REFERENCE TO RELATED APPLICATIONS

This application is a U.S. National Stage Application of International Application No. PCT/JP2011/076843 filed on Nov. 22, 2011, and published in Japanese as WO 2012/077491 A1 on Jun. 14, 2012. This application claims priority to Japanese Application No. 2010-273134 filed on Dec. 8, 2010. The disclosures of the above applications are incorporated herein by reference.

BACKGROUND OF THE INVENTION

1. Field of the Invention

The present invention relates to a gasket.

More particularly, the present invention relates to a gasket which is useful by being used in a battery or the like which is used in an electric vehicle, a fuel cell vehicle, a hybrid vehicle and the like.

2. Description of the Conventional Art

Conventionally, as a gasket for sealing a gap between a case which is a base portion in a lower side of a battery case or the like, and a cover which is a lid portion in an upper side, there has been used an O-ring which has a circular cross section, or a gasket 100 which is obtained by drawing the O-ring in a vertical direction and has a cross sectional shape shown in FIG. 8 (refer to Japanese Unexamined Patent Publication No. 2005-16621).

However, the O-ring has such an advantage that it is simple in a shape so as to be easily produced, and an installing property and a stability after the installation (a seating property) is good, however, has such a disadvantage that a pressing crack tends to be caused at a high compressing time, and a high reaction force is generated.

Accordingly, there is brought about a problem that it can not be used at a position in which a gap greatly fluctuates, and a position in which a material of a case and a cover corresponding to the other end member to be attached is weak, and a width of the O-ring can not help but being larger in a compressed state (a set state) since it is used by compressing a circular cross section. Therefore, there is caused a problem that it can not be used in the case that an installation space is narrow, and a case that a high compression is necessary in comparison with an installation width.

Further, a gasket 100 having a cross sectional shape shown in FIG. 8 can expect an effect of lowering the pressing crack at a time of the high compression and the reaction force to some extent in comparison with the O-ring having a simple shape, however, not only it is impossible to achieve a low reaction force which can be sufficiently satisfied, but also it can not help but being used as a shape of being installed into a groove 210 which is provided in a case 200 as shown in FIG. 8 since a seating property is not good.

Further, it has been impossible to employ an aspect that a bolt hole for fixing the case and the cover is provided in the gasket 100 itself, for making the installation space narrow.

SUMMARY OF THE INVENTION

An object of the present invention is to provide a gasket which has a good installation property of the gasket and a good stability (seating property) after the installation, can be compressed highly by a low reaction force, can be structured such that a bolt hole for fixing a case and a cover is provided in a gasket itself, and has a high reliability.

Means for Solving the Problem

In order to achieve the object mentioned above, in accordance with the present invention, there is provided a gasket sealing a gap between two opposed surfaces, characterized in that the gasket comprises:

a tabular main body portion;

two lip-like projections which are provided in one surface of the main body portion, and extend in parallel to each other along the main body portion;

two small projections which are provided in the other surface of the main body portion and extend in parallel to each other along the main body portion;

through holes which are provided at a plurality of positions of the main body portion; and an annular seal portion which is provided in such a manner as to surround the through holes.

Effect of the Invention

The present invention has effects as described below.

In accordance with the gasket of the invention described in the first aspect, since the installation property of the gasket and the stability (the seating property) after the installation are good, it is possible to achieve the high compression by the low reaction force, and the installation space is narrowed, it is possible to structure such that the bolt hole for fixing the case and the cover is provided in the gasket itself.

Further, in accordance with the gasket of the invention described in the second aspect, it is possible to achieve the gasket in which the high compression can be achieved by a lower reaction force.

Further, in accordance with the gasket of the invention described in the third aspect, it is possible to further enhance a reliability of the sealing performance.

Further, in accordance with the gasket of the invention described in the fourth aspect, the gasket is not compressed excessively, and it is possible to more securely inhibit a damage of the gasket.

Further, in accordance with the gasket of the invention described in the fifth aspect, it is possible to effectively prevent the gasket from being damaged by the bolt at a time of inserting the bolt for fixing the case and the cover into the through hole.

Further, in accordance with the gasket of the invention described in the sixth aspect, since an unnecessary fastening margin is done away with in a used state of the gasket, it is possible to elongate a service life of the gasket.

Further, in accordance with the gasket of the invention described in the seventh aspect, it is possible to attach the gasket accurately and in a stable state, even if the gasket is long.

Further, in accordance with the gasket of the invention described in the eighth aspect, it is possible to achieve the gasket in which the high compression can be achieved by further the lower reaction force.

Further, in accordance with the gasket of the invention described in the ninth aspect, since it is not necessary to form the groove for installing the gasket, it is possible to inexpensively provide a whole of the seal structure.

DETAILED DESCRIPTION OF PREFERRED EMBODIMENT

Figure 1:
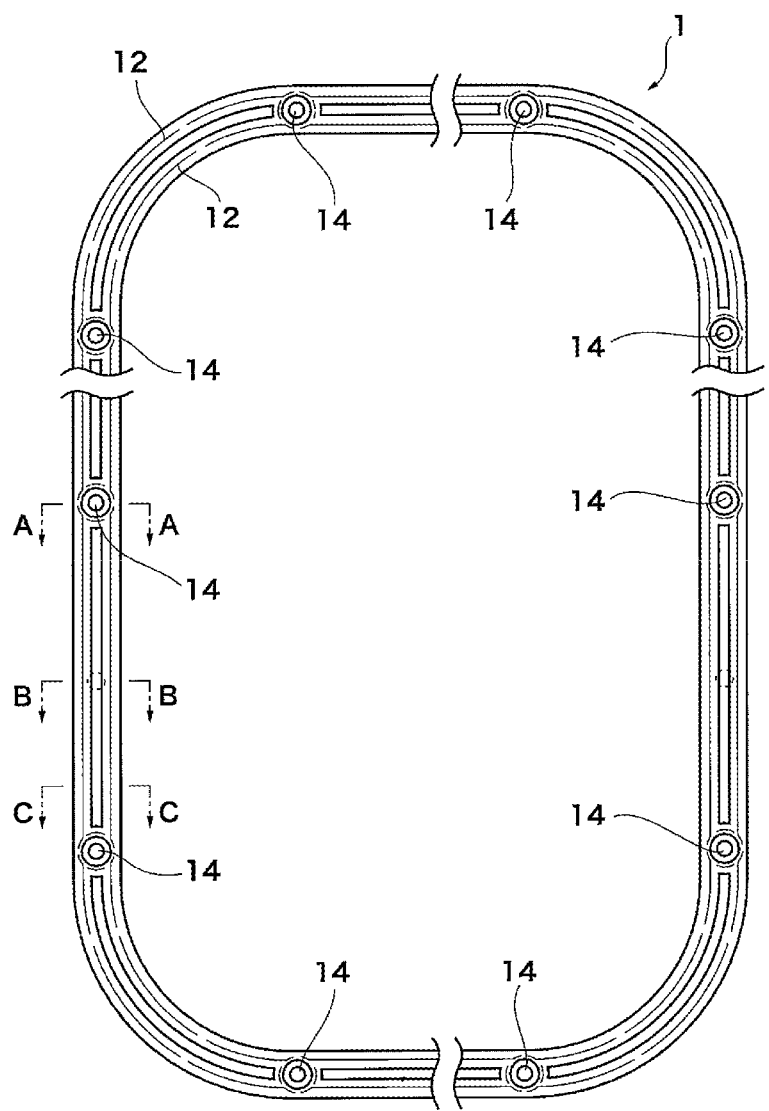
FIG. 1 is a plan view showing a gasket in accordance with the present invention by cutting a part thereof.

A description will be given below of a best mode for carrying out the present invention.

A gasket in accordance with the present invention is a gasket 1 which seals two opposed surfaces 2 and 3, as shown in FIG. 1, FIG. 2, FIG. 3, FIG. 4, FIG. 5, FIG. 6 and FIG. 7, and the gasket 1 is constructed by a tabular main body portion 11, two lip-like projections 12 and 12 which are provided in one surface 111 of the main body portion 11, and extend in parallel to each other along the main body portion 11, two small projections 13 which are provided in the other surface 112 of the main body portion 11, and extend in parallel to each other along the main body portion 11, through holes 14 for inserting bolts which are provided at a plurality of positions of the main body portion 11, and an annular seal portion 15 which is provided in such a manner as to surround the through holes 14.

Figure 5:
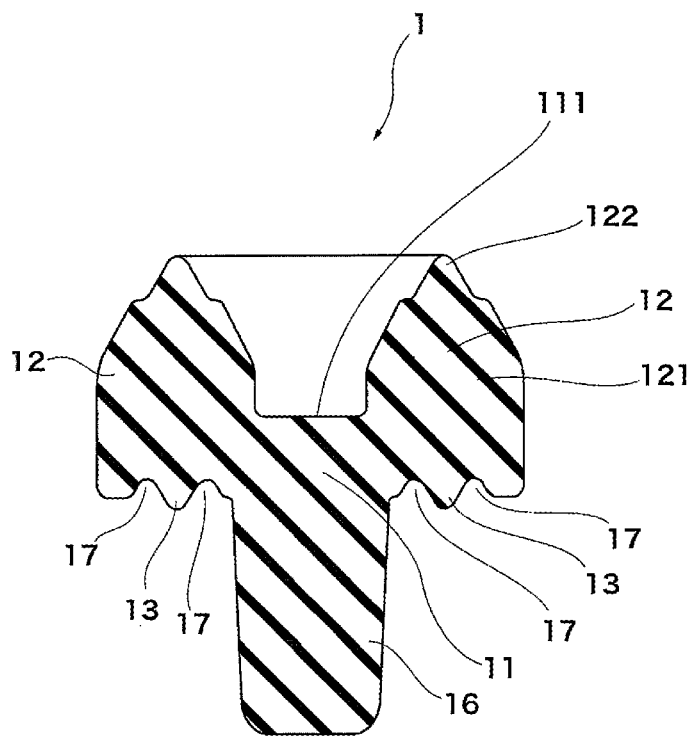
FIG. 5 is a cross sectional view along a line B-B in FIG. 1.
Figure 6:
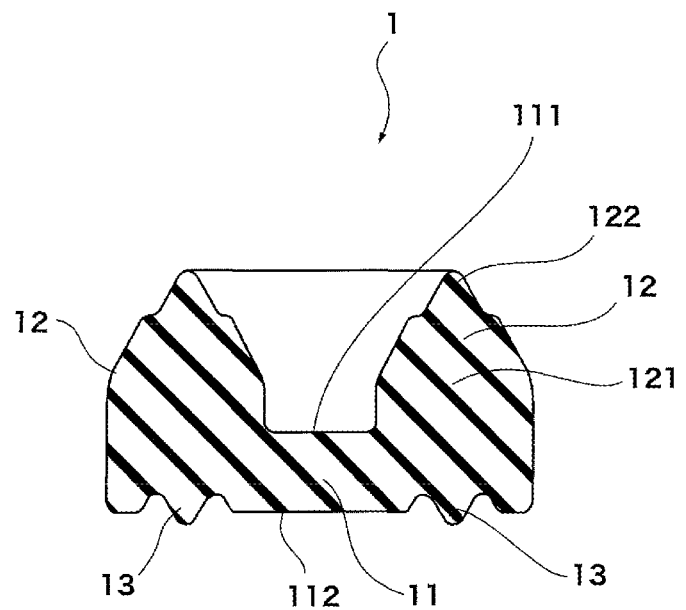
FIG. 6 is a cross sectional view along a line C-C in FIG. 1.

Further, the rip-like projection 12 is formed as a two-stage lip shape in which a sharper mountain portion 122 than a base portion 121 is formed in a top portion of the base portion 121 having a chevron shape, as shown in FIG. 5 and FIG. 6.

As mentioned above, since the main body portion 11 provided with the small projection 13 is retained in a stable state with respect to one surface 3 in which the gasket 1 is arranged, and the lip-like projection 12 is formed as the two-stage lip shape as shown in the drawing, it is possible to achieve a gasket which can highly compress by a low reaction force.

Figure 4:
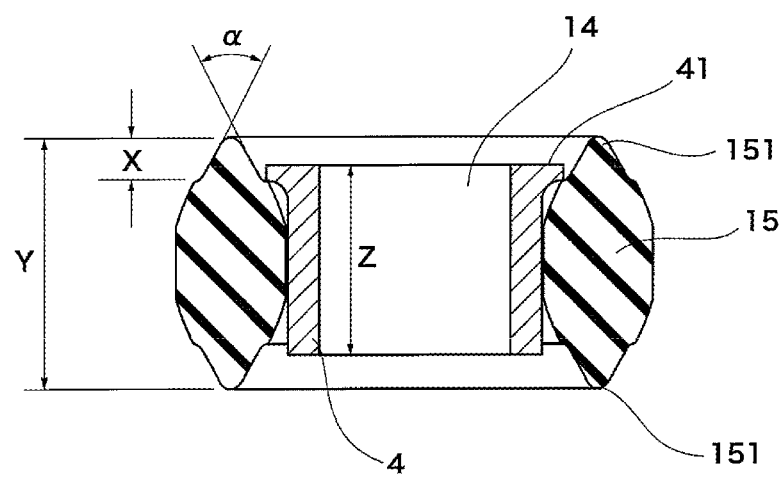
FIG. 4 is a cross sectional view along a line A-A in FIG. 1.

On the other hand, a cross sectional shape of the annular seal portion 15 is formed as a two-stage lip shape which is line symmetrical up and down as shown in FIG. 4.

As mentioned above, the annular seal portion 15 is used at a circumferential shaped position such as the through hole 14, is formed as a vertically symmetrical shape in its cross section, has one or two or more stages between a leading end portion 151 and a center portion, and is formed such a shape that an aspect ratio of a cross section of the annular seal portion 15 is between 1:0.8 and 1:0.3.

Further, a leading end angle α of the leading end portion 151 of the annular seal portion 15 is designed such as to be between 45 and 80 degree, preferably between 55 and 65 degree.

Further, it is preferable for achieving a good sealing performance that a height X of the leading end portion 151 is between 1 and 20% a total height Y, preferably in a range of 3 and 7%.

Further, as shown in FIG. 4, the annular seal portion 15 is formed such a shape that has a largest volume approximately in the center portion (a vertically intermediate portion on the drawing), and is narrowed little by little toward up and down.

Accordingly, since the annular seal portion 15 is compressed uniformly up and down at a time of being compressed from up and down, and the vertically center portion bulges to an outer side so as to protrude, a low reaction force is obtained at a time of a high compression, and the annular seal portion 15 does not come down.

Further, since the annular seal portion 15 is formed as the two-stage lip shape, it generates a high peak surface pressure at a time when an amount of compression of the gasket 1 is small, and it is hard to come down at a time when the amount of compression is large, and a low reaction force can be achieved.

A material which is used in the gasket 1 is a rubber material which is provided with a rubber-like elasticity.

As the rubber material, there can be listed up a nitrile rubber, an acrylic rubber, an EPDM, a chloroprene rubber (CR), a silicone rubber, a fluorocarbon rubber, a natural rubber and the like, and they are appropriately selected in correspondence to various intended uses so as to be employed.

A rubber hardness is preferably between Hs 40 and Hs60, and it is important to be equal to or less than Hs70 for achieving a low reaction force.

On the other hand, as shown in FIG. 4, a metal ring 4 is installed to the through hole 14.

A length Z in an axial direction of the metal ring 4 is shorter than the total height Y of the annular seal portion 15, and in specific is approximately equal to a length which is obtained the height X of the leading end portions 151 and 151 provided in up and down from the height Y.

Accordingly, when the gasket 1 is compressed between upper and lower two surfaces 2 and 3, the metal ring 4 achieves a stopper function, and the gasket 1 is not compressed more than the length Z in the axial direction of the metal ring 4. Therefore, it is possible to avoid such a matter that the gasket 1 is excessively compressed and a pressing crack is generated.

Further, since only a region of the leading end portions 151 and 151 having the low reaction force is compressed, a total function of the gasket 1 can be maintained for a long time period.

Further, a flange portion 41 extending outward in a diametrical direction is provided in one end portion in an axial direction of the metal ring 4.

Accordingly, even if an insertion position of a bolt is somewhat deviated at a time of inserting a fixing means such as the bolt or the like into the through hole 14, it is possible to prevent the bolt from coming into contact with the gasket 1, by means of the flange portion 41, and it is possible to effectively prevent the gasket 1 from being damaged.

Therefore, it is necessary to make the flange portion 41 exist in a side to which the fixing means such as the bolt or the like is inserted.

Figure 7:
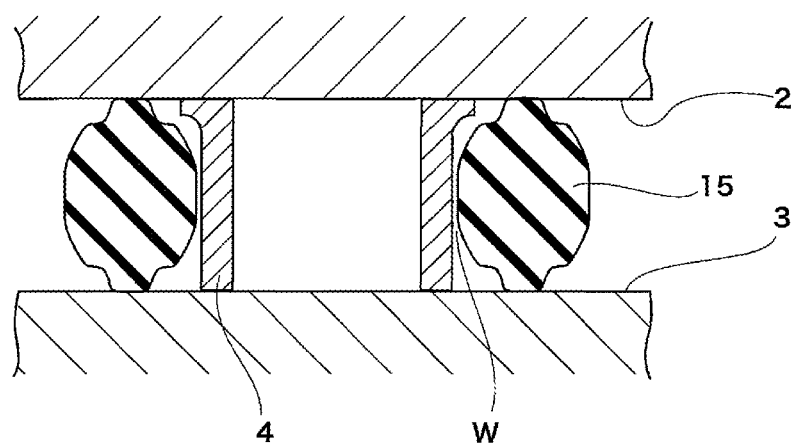
FIG. 7 is a cross sectional view of a state in which a position shown in FIG. 5 is compressed to a used state.
Figure 8:
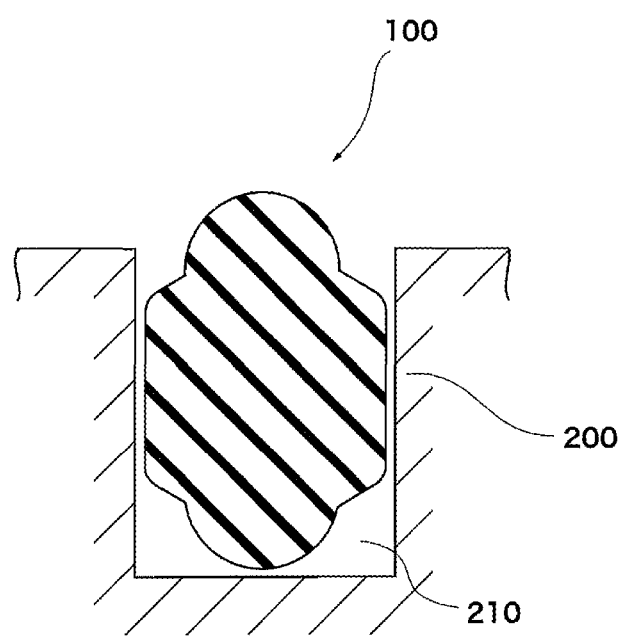
FIG. 8 is a cross sectional view of a gasket in accordance with a prior art.

Further, as shown in FIG. 7, a fastening margin between an outer peripheral surface of the metal ring 4 and an inner peripheral surface of the annular seal portion 15 is designed to such a value that a whole of the annular seal portion 15 expands outward in a diametrical direction in a used state in which the gasket 1 is compressed and pinched between the surface 3 of the case corresponding to a base portion in a lower side of the battery case or the like, and the surface 2 of the cover corresponding to a lid portion in an upper side, whereby the fastening margin is done away with (a gap W is generated between the outer peripheral surface of the metal ring 4 and the inner peripheral surface of the annular seal portion 15).

In accordance with this, since an unnecessary fastening margin is done away with in the used state of the gasket, it is possible to elongate a service life of the gasket.

Figure 2:
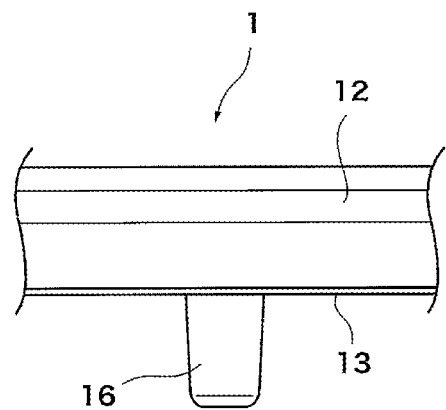
FIG. 2 is a partial side elevational view of FIG. 1.
Figure 3:
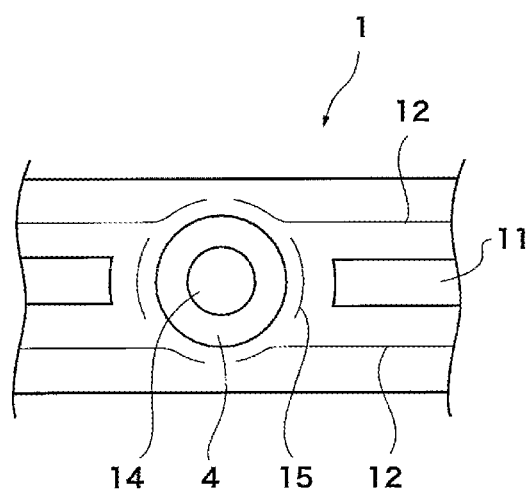
FIG. 3 is a partly enlarged view of FIG. 1.

Further, as shown in FIG. 2 and FIG. 5, a plurality of positioning projections 16 and 16 are formed on the other surface side of the main body portion 11, for inserting to a hole which is provided in one of two surfaces 2 and 3 pinching the gasket 1.

Since the positioning projections 16 and 16 which are provided at a fixed distance are sequentially inserted to the hole provided in the other surface 2 or 3, it is easy to install the gasket 1, and any unnecessary stress is not applied to the gasket 1 at an installing time. Therefore, an initial sealing performance is good, and a stable sealing performance can be maintained for a long time period.

Further, clearance grooves 17 and 17 are provided in both sides of the small projections 13 and 13.

Accordingly, since a part of the small projections 13 and 13 can enter into the clearance grooves 17 and 17 at a time when the small projections 13 and 13 are compressed, it is possible to maintain the low reaction force of the small projections 13 and 13.

Further, as is apparent from FIG. 7, it is formed as a flat surface shape in which the groove portion is not provided in any of the surfaces 2 and 3 by which the gasket 1 is pinched.

The gasket 1 in accordance with the present invention can achieve a particularly stable sealing performance in the attaching structure in which the groove portion does not exist as mentioned above.

Therefore, it is possible to inexpensively achieve a particularly stable sealing performance.

Further, it goes without saying that the present invention is not limited to the best mode for executing the invention mentioned above, but can employ the other various structures without deviating from the scope of the present invention.

INDUSTRIAL APPLICABILITY

The gasket in accordance with present invention can be used for sealing the gap between the case corresponding to the base portion in the lower side of the battery or the like which is used in the electric vehicle, the fuel cell vehicle, the hybrid vehicle or the like, and the cover corresponding to the lid portion in the upper side.

What is claimed is:

1. A gasket that forms a seal by being pinched between two opposed flat surfaces, said gasket comprising:
   a main body portion having one surface and an other surface opposite the one surface;
   two lip projections which are provided on the one surface of said main body portion, the two lip projections extending in parallel to each other along said main body portion;
   two small projections which are provided on the other surface of said main body portion, the two small projections extending in parallel to each other along said main body portion;
   through holes which are provided at a plurality of positions of said main body portion;
   annular seal portions which are provided so as to respectively surround each of said through holes; and
   metal rings which are respectively inserted into each of said through holes, wherein said metal rings are stoppers configured to prevent said gasket from being excessively compressed when said gasket is pinched and compressed between said two opposed flat surfaces;
   wherein an entirety of said main body portion is made of an elastomeric material; and
   wherein said lip projection has a two-stage lip shape including:
   a tapered base portion; and
   a tapered top portion extending from said tapered base portion, said tapered top portion having a steeper taper than said tapered base portion.

2. The gasket as claimed in claim 1, wherein a cross sectional shape of each of said annular seal portion portions is a two-stage lip shape which is line symmetrical.

3. The gasket as claimed in claim 1, wherein said gasket is pinched in a non-bonded state with respect to said two opposed flat surfaces.

4. The gasket as claimed claim 1, wherein a flat surface portion is provided on an outer side of each of said two small projections, each flat surface portion being provided on the other surface of said main body portion and extending parallel to said two small projections.

5. The gasket as claimed in claim 1, wherein a fastening margin between an outer peripheral surface of said metal ring and an inner peripheral surface of each of said annular seal portions is such a value that a gap remains between said outer peripheral surface of said metal ring and said inner peripheral surface of each of said annular seal portion portions in a used state in which said gasket is compressed and pinched between said two surfaces.

6. The gasket as claimed in claim 1, wherein a positioning projection is formed on the other surface of said main body portion, the positioning projection being configured to be inserted into a hole which is provided in one of said two opposed flat surfaces.

7. The gasket as claimed in claim 1, wherein a clearance groove is provided along both sides of each of said small projections.

* * * * *